(12) United States Patent
Raney et al.

(10) Patent No.: US 11,012,327 B2
(45) Date of Patent: May 18, 2021

(54) DROP DETECTION AND PROTECTION FOR NETWORK PACKET MONITORING IN VIRTUAL PROCESSING ENVIRONMENTS

(71) Applicant: Keysight Technologies Singapore (Sales) Pte. Ltd., Singapore (SG)

(72) Inventors: Kristopher Raney, Austin, TX (US); Matthew R. Bergeron, Austin, TX (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 0 days.

(21) Appl. No.: 15/949,578

(22) Filed: Apr. 10, 2018

(65) Prior Publication Data

US 2018/0367422 A1 Dec. 20, 2018

Related U.S. Application Data

(60) Provisional application No. 62/521,762, filed on Jun. 19, 2017.

(51) Int. Cl.
*G06F 9/455* (2018.01)
*H04L 12/26* (2006.01)
(Continued)

(52) U.S. Cl.
CPC ........ *H04L 43/022* (2013.01); *G06F 9/45533* (2013.01); *G06F 9/45558* (2013.01);
(Continued)

(58) Field of Classification Search
None
See application file for complete search history.

(56) References Cited

U.S. PATENT DOCUMENTS 5,367,523 A * 11/1994 Chang ............... H04L 47/10
370/235
8,817,649 B2  8/2014 Dong et al.
(Continued)

FOREIGN PATENT DOCUMENTS

| CN | 105677538 | 6/2016 |
| EP | 2661020 | 4/2013 |
| EP | 2916582 | 9/2013 |

OTHER PUBLICATIONS

European Search report, EP18172578.9, dated Oct. 22, 2018, 9 pgs.
(Continued)

*Primary Examiner* — Sai Aung
*Assistant Examiner* — Liem H. Nguyen

(57) ABSTRACT

Systems and methods are disclosed for drop detection and protection with respect to packet monitoring in virtual processing environments. Tap agents monitor and capture packets from the network traffic associated with network applications running within these virtual processing environments. Sequence numbers are added in packet encapsulation before tap packets are forwarded to tool agents. The tool agents then use the sequence numbers to detect packet drops within the tap packets. After drop detection, the tool agents send drop detection messages to an agent controller, and the agent controller generates and sends reconfiguration messages to the tap agents based upon the drop detection messages. The tool agents can also send drop detection messages directly to the tap agents. The tap agents adjust their operations based upon the reconfiguration messages and/or the drop detection messages to reduce packet drops within subsequent tap packets communications.

20 Claims, 9 Drawing Sheets

(51) Int. Cl.
*H04L 12/801* (2013.01)
*H04L 12/851* (2013.01)
*H04L 29/06* (2006.01)
*H04L 29/08* (2006.01)

(52) U.S. Cl.
CPC .......... *H04L 43/024* (2013.01); *H04L 43/062* (2013.01); *H04L 43/12* (2013.01); *H04L 47/34* (2013.01); *H04L 67/10* (2013.01); *G06F 2009/45587* (2013.01); *G06F 2009/45591* (2013.01); *G06F 2009/45595* (2013.01); *H04L 43/0835* (2013.01); *H04L 47/2483* (2013.01); *H04L 69/22* (2013.01); *H04L 2212/00* (2013.01)

(56) References Cited

U.S. PATENT DOCUMENTS

| | | | |
|---|---|---|---|
| 8,838,779 | B2 | 9/2014 | Gopisetty et al. |
| 9,110,703 | B2 | 8/2015 | Santos et al. |
| 9,319,911 | B2 | 4/2016 | Gupta et al. |
| 9,432,385 | B2 * | 8/2016 | Kustarz ............... H04L 63/1441 |
| 9,544,800 | B2 | 1/2017 | Gupta et al. |
| 9,680,728 | B2 | 6/2017 | Besser |
| 10,771,345 | B1 * | 9/2020 | Louca ................. H04L 41/0813 |
| 2002/0097678 | A1 * | 7/2002 | Bisher, Jr. ............... H04J 3/247 370/232 |
| 2005/0174961 | A1 | 8/2005 | Hrastar |
| 2007/0038738 | A1 | 2/2007 | Iyengar |
| 2007/0038744 | A1 | 2/2007 | Cocks et al. |
| 2009/0041114 | A1 * | 2/2009 | Clark ................. H04L 43/0829 375/240.01 |
| 2009/0257352 | A1 | 10/2009 | Imai |
| 2011/0004698 | A1 | 1/2011 | Wu |
| 2013/0031233 | A1 | 1/2013 | Feng et al. |
| 2013/0291109 | A1 | 10/2013 | Staniford et al. |
| 2014/0229605 | A1 | 8/2014 | Besser |
| 2014/0269777 | A1 * | 9/2014 | Rothstein ........... H04L 43/0823 370/503 |
| 2014/0365832 | A1 * | 12/2014 | Neeb .................... G06F 13/1673 714/43 |
| 2015/0026794 | A1 * | 1/2015 | Zuk ........................ H04L 45/38 726/13 |
| 2015/0263889 | A1 | 9/2015 | Newton |
| 2015/0319030 | A1 | 11/2015 | Nachum |
| 2016/0065423 | A1 * | 3/2016 | Zhang ................... H04L 47/125 370/235 |
| 2016/0094418 | A1 | 3/2016 | Raney |
| 2016/0094419 | A1 | 3/2016 | Peacock et al. |
| 2016/0110211 | A1 | 4/2016 | Karnes |
| 2016/0182336 | A1 * | 6/2016 | Doctor ................. H04L 43/062 709/224 |
| 2016/0285722 | A1 * | 9/2016 | Min ..................... H04L 43/0876 |
| 2016/0315815 | A1 * | 10/2016 | Sharma ............... H04L 41/0806 |
| 2016/0359917 | A1 * | 12/2016 | Rao .................... H04L 41/0803 |
| 2017/0054612 | A1 * | 2/2017 | Yi ........................... H04W 4/70 |
| 2017/0099195 | A1 | 4/2017 | Raney |
| 2017/0099197 | A1 | 4/2017 | Raney |
| 2017/0118102 | A1 | 4/2017 | Majumder et al. |
| 2017/0134538 | A1 * | 5/2017 | Mahkonen ............. H04L 49/70 |
| 2017/0163510 | A1 | 6/2017 | Arora et al. |
| 2017/0295035 | A1 * | 10/2017 | Mathew ................. H04L 45/54 |
| 2018/0091387 | A1 * | 3/2018 | Levi .................... H04L 67/1095 |
| 2018/0254997 | A1 * | 9/2018 | Clarke .................. H04L 67/12 |

OTHER PUBLICATIONS

Ixia, Ixia xFilter, Data Sheet, 5 pgs. (May 2015).
Ixia, Ixia Phantom vTap With TapFlow Filtering, Data Sheet, 4 pgs. (Jul. 2015).
Ixia, Ixia Flex Tap, Data Sheet, 5 pgs. (Oct. 2015).
Hofstede et al., "Flow Monitoring Explained: From Packet Capture to Data Analysis With NetFlow and IPFIX", IEEE, 31 pgs. (May 2014).

* cited by examiner

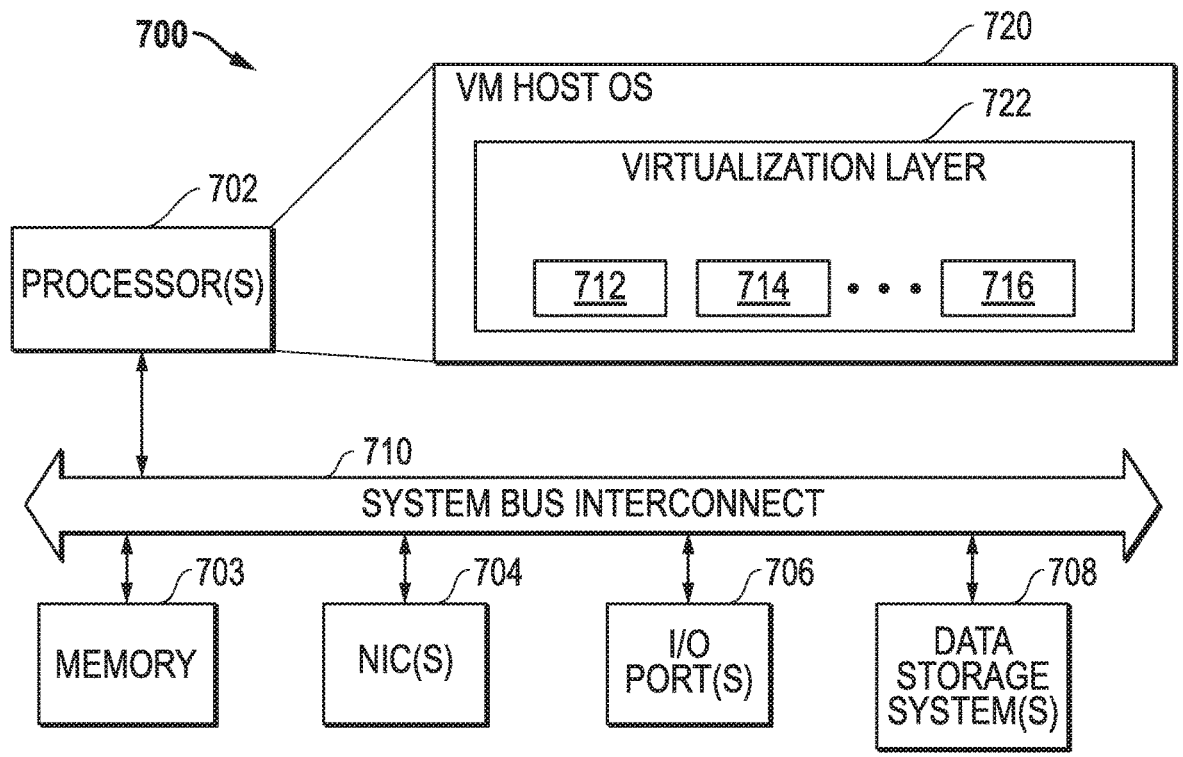
FIG. 7
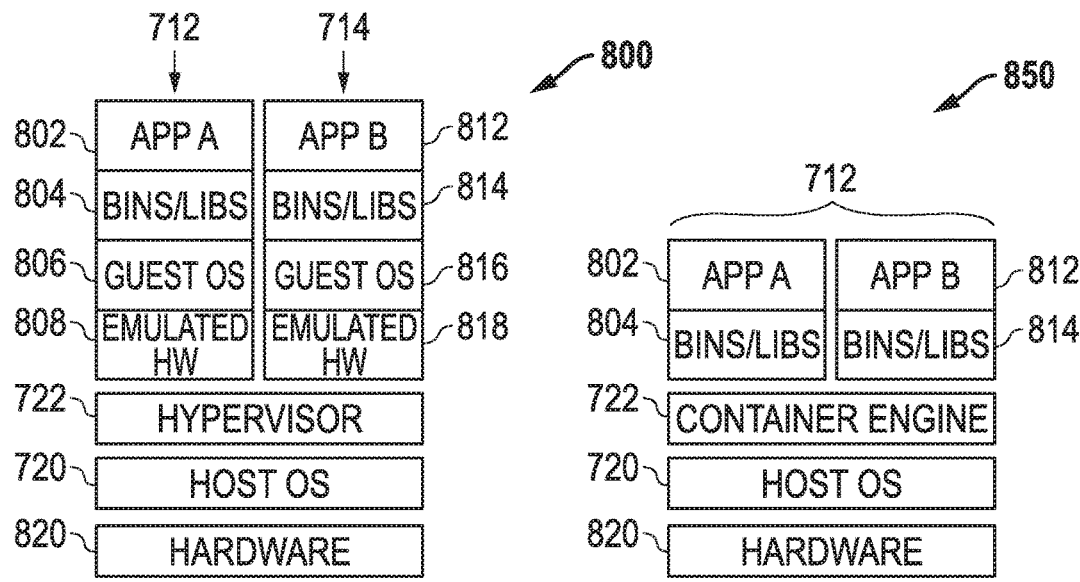
FIG. 8A
FIG. 8B

DROP DETECTION AND PROTECTION FOR NETWORK PACKET MONITORING IN VIRTUAL PROCESSING ENVIRONMENTS

RELATED APPLICATIONS

This application claims priority to U.S. Provisional Patent Application Ser. No. 62/521,762, which was filed Jun. 19, 2017, and is entitled "DROP DETECTION AND PROTECTION FOR NETWORK PACKET MONITORING IN VIRTUAL PROCESSING ENVIRONMENTS," which is hereby incorporated by reference in its entirety.

TECHNICAL FIELD

This invention relates to monitoring network packets within network communication systems and, more particularly, to monitoring network packets within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors, and/or other network tool devices or systems. Network analysis tools are used within packet-based data networks to monitor various details and detect various activities with respect to the network packet traffic flows within the packet communication network infrastructure.

Certain network communication systems also include virtual processing environments that include virtual platforms hosted by one or more host servers. For example, network applications and resources can be made available to network-connected systems as virtualized resources operating as virtual platforms within virtualization layers on host servers. In some embodiments, processors or other programmable integrated circuits associated with a server (e.g., server blade) and/or combinations of such servers operate to provide such virtual platforms and related virtualization layers. By operating multiple virtual platforms including application instances within such virtualization layers also operating on the hardware of the host server, a variety of virtual processing resources can be provided internally to the virtual processing environment and/or externally to other network-connected processing systems and devices.

When a network to be monitored includes virtual processing environments, however, difficulties arise in managing and controlling packet traffic for network communications with virtual platforms operating within such virtual processing environments. For example, cloud based computing services (e.g., Amazon Web Services) allow a wide variety of external users to obtain dedicated and elastic processing resources within virtual processing environments running on a large number of interconnected servers. These external users can install, initialize, and operate a wide variety of user application as instances within virtual platforms operating within the virtual processing environment. Further, the external users can be corporate or commercial entities that provide multiple different application services to employees and/or end-user consumers of the processing resources. When one or more of these external users desires to monitor, manage, and/or control traffic with respect to their respective virtual platforms, difficulties arise in obtaining and managing the network packet traffic to be monitored.

For network packet monitoring in certain virtual processing environments, one difficulty arises when packet drops occur with respect to packet traffic that is captured from monitored traffic flows. For example, virtual tap agents can be operated within virtual processing environments and associated with network applications to monitor, capture, and forward packet traffic for analysis and processing by one or more network tools. These virtual tap agents can be considered "in-line" monitoring solutions as they directly monitor incoming and outgoing packet traffic flows. For their operations, these virtual tap agents use server and/or network resources (e.g., CPU bandwidth, network bandwidth, etc.) associated with the virtual processing environment in which they are operating. Events associated with these server/network resources, however, can lead to packet drops within packets that are captured and forwarded by the tap agents to the network tools thereby degrading the viability of network traffic monitoring.

FIG. 1A (Prior Art) is a block diagram of an example embodiment 100 for packet capture within a virtual processing environment where an event 120 leads to dropped packets. For the embodiment 100, a host server 102 hosts a network application 104 and a tap agent 106 that are operating within a virtual processing environment, and a host server 112 hosts a network tool 114 and a tool agent 116 that are operating within a virtual processing environment. The tap agent 106 operates to monitor and capture packets associated with the application packet traffic 109 flowing to and from the network communication paths 110 with respect to network application 104. The tap agent 106 then communicates the captured packets as tap packet (PKT) traffic 108 to the tap agent 116, and the tap agent 116 provides these packets to the network tool 114 for further processing.

When network bandwidth and/or conditions are adequate for the packet communications, the captured packets within tap packet traffic 108 are all received by the tap agent 116. However, various events 120, such as network congestion and/or resource events, can cause packets to be dropped. For example, packets can be dropped due to resource congestion on the host system, policy violations by the virtual tap agent (e.g., per-instance bandwidth use policy limitations, outbound message rate caps, etc.), and/or other events. When these drop events occur, the tap packet traffic 108 received by the tap agent include only a subset of the captured packets due to drops. Determining that packet drops are occurring with respect to the tap packet traffic 108 can be difficult, if not impossible. For example, the virtual tap agent 106 is not able to directly determine overall resource utilization and performance of the hosting virtual environment for the host server 102 (e.g., CPU load, memory load, etc.), and consequently runs the risk of congesting the host system. In such scenarios, captured packet and other monitoring-related packets (e.g., NetFlow messages) may be dropped by the host server 102. The tap agent 106 and the tool agent 116 will typically not know that these packets have dropped, as there is no way for the transmitting virtual tap agent 106 or the receiving virtual tool agent 116 to know if monitoring-related packets have been dropped by the host system. Typical connection-oriented protocols for confirming packet delivery are not useful for this communication of captured packets for packet monitoring within virtual processing environments.

FIG. 1B (Prior Art) provides an example embodiment 150 for such a typical connection-oriented protocol, such as TCP (Transmission Control Protocol), that uses sequence numbers and "retry" messages to confirm packet delivery. A transmit device 152 sends packets 156 including sequence numbers, such as TCP sequence numbers, to a receive device 154. The transmit device 152 then buffers at least a portion of the transmitted packets as indicated by block 158. The receive device 154 analyzes the received packets and detects dropped packets when a missing sequence number is detected as indicated by block 160. When a packet drop is detected, the receive device 154 sends a packet retry message 162 back to the transmit device 152 identifying the missing sequence number. The transmit device 152 then accesses the buffered transmit packets to locate the packet including the missing sequence number as indicated by block 164, and resends this missing packet 166 to the receive device 154.

These typical connection-oriented techniques for detecting and resolving packet drops, however, are generally not useful for transporting packet monitoring traffic from network tap devices as there is no return path for retry messages. For example, for the embodiment 100 of FIG. 1, the receiving tool agent 116 does not have a return path to communicate a retry message to the tap agent 106. Further, if such retry and resend techniques were implemented between the tool agent 116 and the tap agent 106, the additional packet traffic would likely further degrade the resource event that caused the packet drops in the first place.

One possible solution to this problem of detecting and resolving dropped packets in a network traffic monitoring environment is manual oversight by network administrators. For example, a network administrator can review packet traffic statistics associated with transmitted packets by the tap agent 106 and packet traffic statistics associated with received packets at the tool agent 116. The manual review of these statistics can then be used to determine if significant differences exist between transmitted and received packets. If so, the network administrator can conclude that packets are being dropped and can further investigate whether network and/or system events are causing the packet drops. This manual oversight, however, would provide a limited and inefficient technique for packet drop determinations and resolution for packet monitoring within virtual processing environments.

SUMMARY

Systems and methods are disclosed for drop detection and protection with respect to packet monitoring in virtual processing environments. Tap agents monitor and capture packets from the network traffic associated with network applications running within these virtual processing environments. Sequence numbers are added in packet encapsulation before tap packets are forwarded to tool agents. The tool agents then use the sequence numbers to detect packet drops within the tap packets. After drop detection, the tool agents send drop detection messages to an agent controller, and the agent controller generates and sends reconfiguration messages to the tap agents based upon the drop detection messages. The tool agents can also send drop detection messages directly to the tap agents. The tap agents adjust their operations based upon the reconfiguration messages and/or the drop detection messages to reduce packet drops within subsequent tap packets communications. Stream identifiers, timestamps, and/or additional features can also be used in addition to sequence numbers with respect to the packet encapsulation. Various embodiments are disclosed and different features and variations can be implemented and utilized.

For one embodiment, a method to reduce packet drops for network traffic monitoring is disclosed including communicating network traffic with a network application operating within a first virtual processing environment within a first host server and, at a tap agent also operating within the first virtual processing environment, monitoring and capturing packets from the network traffic, encapsulating at least a portion of the captured packets with headers including sequence numbers to generate tap packets, and forwarding at least a portion of the tap packets to a tool agent operating within a second virtual processing environment within a second host server. The method also includes, at the tool agent operating within the second virtual processing environment, detecting dropped packets within the tap packets based upon the sequence numbers and outputting a drop detection message based upon the detected dropped packets. The method further includes, at the tap agent, adjusting operation based upon the drop detection message to reduce packet drops within subsequent tap packets forwarded to the tool agent and repeating the monitoring and capturing, encapsulating, and forwarding.

In additional embodiments, the method also includes receiving the drop detection message at an agent controller and, at the agent controller, generating a reconfiguration message based upon the drop detection message and sending the reconfiguration message to the tap agent. In further embodiments, the tap agent adjusts operation based upon the reconfiguration message received from the agent controller that is based upon the drop detection message.

In additional embodiments, the drop detection message is received directly by the tap agent from the tool agent. In further embodiments, the method also includes, at the tool agent, sending at least a portion of the tap packets to a network tool also operating within the second virtual processing environment. In still further embodiments, the encapsulating adds a unique sequence number to each tap packet.

In additional embodiments, the encapsulating adds a stream identifier and a sequence number to each tap packet. In further embodiments, a plurality of processes are run by the tap agent to monitor and capture packets, and the stream identifier identifies a process among the plurality of processes associated with capture of each packet. In still further embodiments, the tap packets having a same stream identifier are encapsulated to have unique sequence numbers with respect to each other.

In additional embodiments, the adjusting includes at least one of decreasing sampling rates or truncating payloads for subsequent captured packets. In further embodiments, the adjusting includes generating metadata for subsequent captured packets and forwarding the metadata rather than payload data to the tool agent.

In additional embodiments, the method also includes resetting the tap agent to remove adjustments made by the tap agent to its operation. In further embodiments, the resetting is based upon a selected timeout period during which additional dropped packets are not detected.

In additional embodiments, the detecting is based upon a tap packet with a next sequence number not being received within a selected time period. In further embodiments, the encapsulating includes timestamps in the tap packets, and wherein the detecting uses the timestamps.

In additional embodiments, the method further includes generating and sending an alert message based upon the drop detection message. In further embodiments, the alert message is configured to provide at least one of a log that a drop has occurred or an indication that an adjustment action has been taken.

For one embodiment a network system to reduce packet drops for network traffic monitoring is disclosed including a first host server for a network communication system programmed to provide a first virtual processing environment and a second host server for a network communication system programmed to provide a second virtual processing environment. The first host server includes a network application configured to communicate network traffic and a tap agent configured to monitor and capture packets from the network traffic, encapsulate at least a portion of the captured packets with headers including sequence numbers to generate tap packets, and to forward at least a portion of the tap packets to a tool agent operating within a second virtual processing environment within a second host server. The second host server includes a tool agent configured to detect dropped packets within the tap packets based upon the sequence numbers and to output a drop detection message based upon the detected dropped packets. The tap agent is further configured to adjust operation based upon the drop detection message to reduce packet drops within subsequent tap packets forwarded to the tool agent.

In additional embodiments, the system further includes an agent controller configured to receive the drop detection message, to generate a reconfiguration message based upon the drop detection message, and to send the reconfiguration message to the tap agent. In further embodiments, the tap agent is further configured to adjust operation based upon the reconfiguration message received from the agent controller that is based upon the drop detection message.

In additional embodiments, the drop detection message is received directly by the tap agent from the tool agent. In further embodiments, the tool agent is further configured to send at least a portion of the tap packets to a network tool configured to operate within the second virtual processing environment. In still further embodiments, the tap agent is configured to encapsulate by adding a unique sequence number to each tap packet.

In additional embodiments, the tap agent is configured to encapsulate by adding a stream identifier and a sequence number to each tap packet. In further embodiments, the stream identifier is configured to identify one of a plurality of process associated with capture of each packet by the tap agent. In still further embodiments, the tap agent is configured to encapsulate tap packets having a same stream identifier with unique sequence numbers with respect to each other.

In additional embodiments, the tap agent is configured to adjust operation by at least one of decreasing sampling rates or truncating payloads for subsequent captured packets. In further embodiments, the tap agent is configured to adjust operation by generating metadata for subsequent captured packets and forwarding the metadata rather than payload data to the tool agent.

In additional embodiments, the tap agent is configured to be reset to remove adjustments made by the tap agent to its operation. In further embodiments, the reset is based upon a selected timeout period during which additional dropped packets are not detected.

In additional embodiments, the tool agent is configured to detect a dropped packet based upon a tap packet with a next sequence number not being received within a selected time period. In further embodiments, the tap agent is configured to encapsulate by adding timestamps to the tap packets, and wherein the tool agent is configured to use the timestamps to detect dropped packets.

In additional embodiments, an alert message is generated based upon the drop detection message. In further embodiments, the alert message is configured to provide at least one of a log that a drop has occurred or an indication that an adjustment action has been taken.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 7 is a block diagram of an example embodiment for a host server.

FIGS. 8A-B are block diagrams of example embodiments for virtual platforms and related virtualization layers that can run within host servers.

DETAILED DESCRIPTION

Figure 1A:
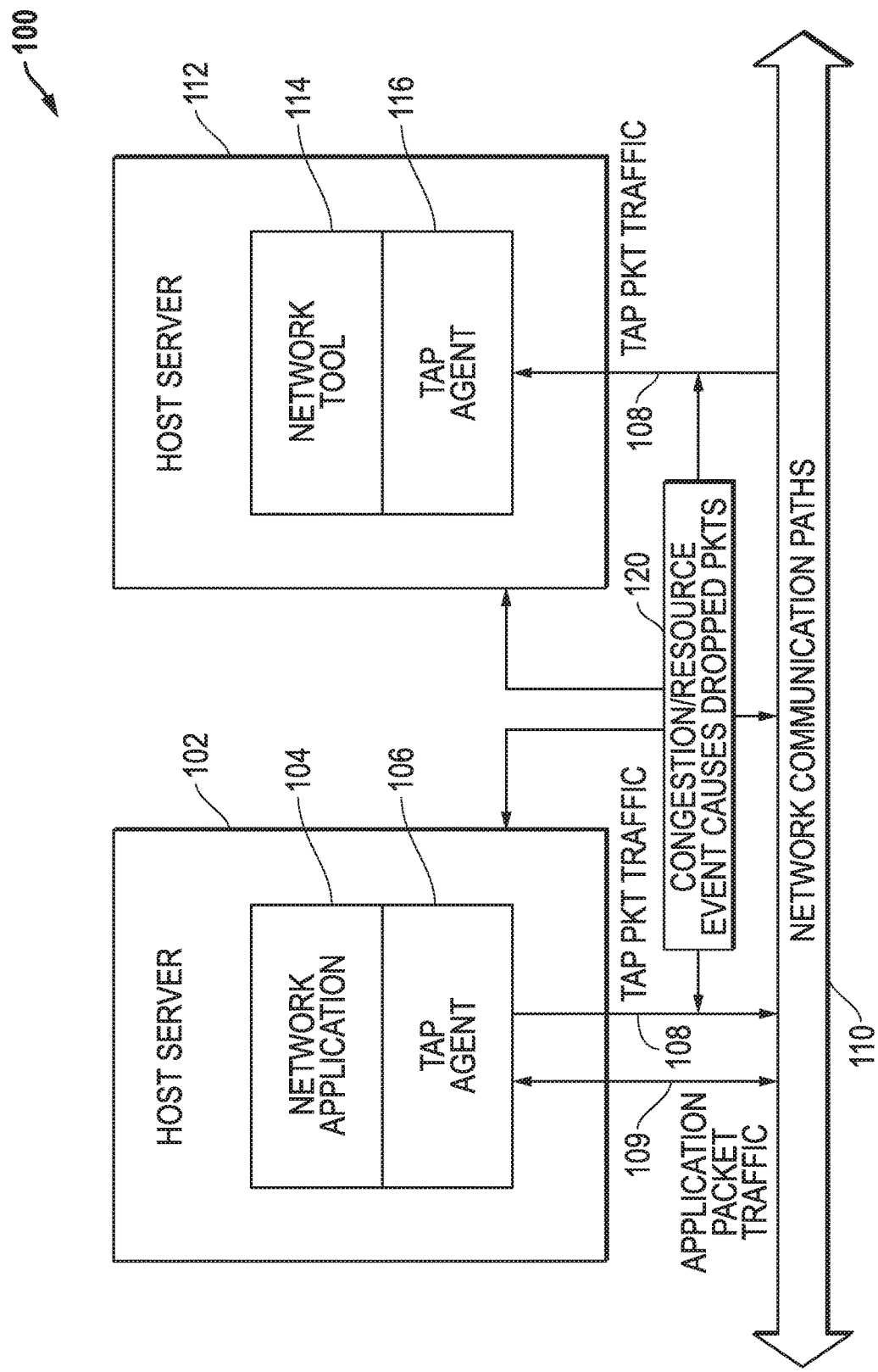
FIG. 1A (Prior Art) is a block diagram of an example embodiment for packet capture within a virtual processing environment where an event leads to dropped packets within communications of monitored and captured packets to a network analysis tool.
Figure 1B:
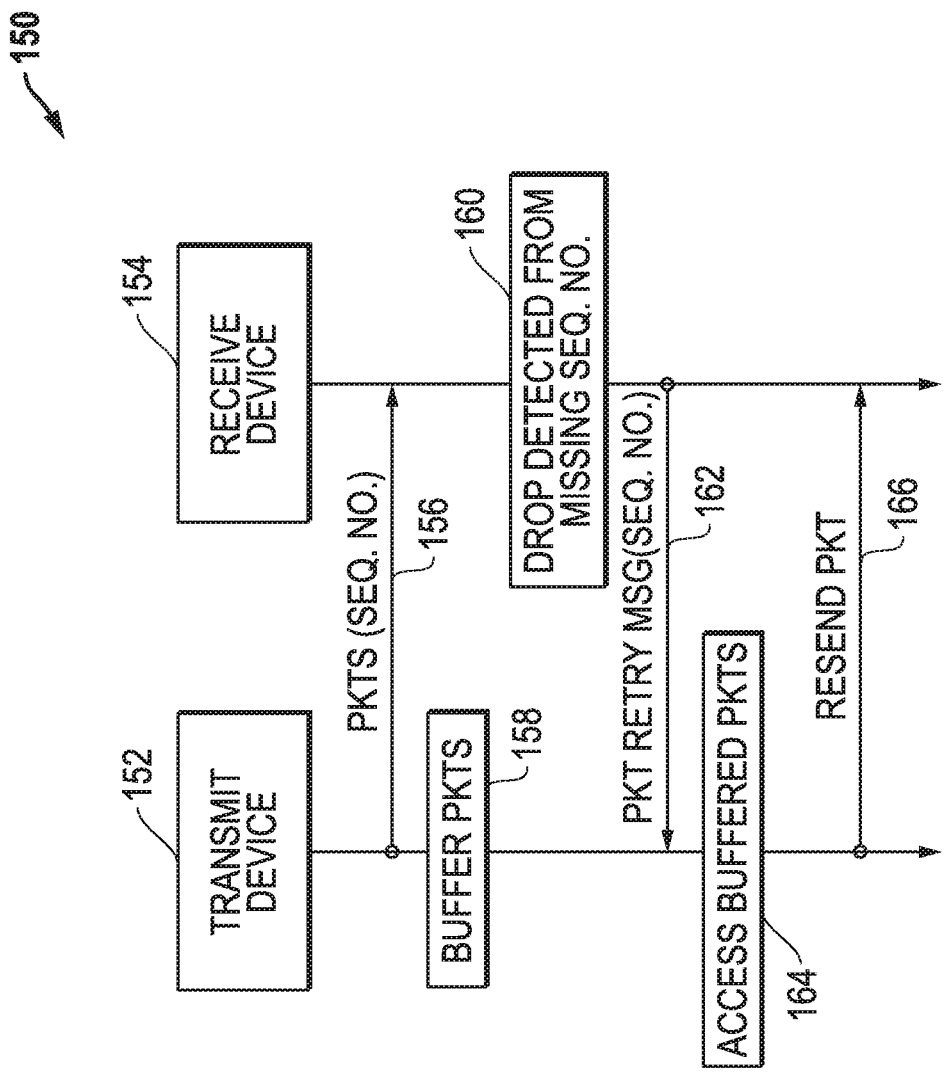
FIG. 1B (Prior Art) provides an example embodiment for a typical connection-oriented protocol that uses sequence numbers and "retry" messages to confirm packet delivery.

Systems and methods are disclosed for drop detection and protection with respect to packet monitoring in virtual processing environments. Various embodiments are disclosed and different features and variations can be implemented and utilized.

For the embodiments disclosed, tap agents are installed and run with respect to network application instances operating within a virtual processing environment. These tap agents are configured to capture packet traffic associated with these network application instances. For the embodiments disclosed herein, packet drop detection techniques are applied along with adaptive drop protection rules so that packet drops are avoided for tap packets that are captured and transmitted by tap agents. In particular, sequence numbers are added in packet encapsulation before tap packets are forwarded to tool agents. The tool agents then use the sequence numbers to detect packet drops within the tap packets. After drop detection, the tool agents send drop detection messages to an agent controller, and the agent controller generates and sends reconfiguration messages to the tap agents based upon the drop detection messages. The tool agents can also send drop detection messages directly to the tap agents. The tap agents adjust their operations based upon the reconfiguration messages and/or the drop detection messages to reduce packet drops within subsequent tap packets communications. Stream identifiers, timestamps, and/or additional features can also be used in addition to sequence numbers with respect to the packet encapsulation. For the disclosed embodiments, resource congested, policy violation, and/or other events associated with host server(s) that cause dropped packets with respect to these tap packets are automatically detected, and automatic and intelligent adjustments are made to the monitoring operations to improve the fidelity of communications between all tap agents and the tool agents and/or network packet brokers (NPBs) that are receiving the tap packet flows from the tap agents operating within the virtual processing environment.

Embodiments of the present invention include network monitoring systems that are configured to monitor communications associated with virtual platforms running in virtual processing environments on host servers. In the disclosed embodiments, the network monitoring systems include one or more virtual tap agents that run as virtual instances on host servers to monitor application instances (e.g., Netflix application instance, etc.) also running on the host servers. These network monitoring systems also include one or more virtual tool agents that run as virtual instances on host servers to interface with monitoring tools (e.g., intrusion detection systems, etc.) also running on the host servers. In certain embodiments, the network monitoring systems further include an agent controller configured to receive drop detection information from the tool agents related to the detection of dropped packets within tap traffic from the operations of the tap agents. In response to this drop detection, the agent controller is further configured to adjust the operation of the tap agents to protect against subsequent dropped packets. In addition, the agent controller can also be configured to configure, manage, and control the tap agents and to receive monitoring information from the tap agents related to the monitored application instances. This monitoring information may include, but is not limited to, complete or partial copies of packets transmitted/received by the monitored instance and/or metadata associated with packets transmitted/received by the monitored application instances (e.g., packet flow statistics, NetFlow metrics, etc.). Other variations can also be implemented while still taking advantage of the drop detection and protection techniques described herein.

To provide drop detection as described further below, the virtual tap agents capture and then transmit monitored packet copies using packet tunneling with encapsulation headers that include sequence numbers. The receiving instance, such as a tool agent or network packet broker (NPB) application, analyzes the received packet sequence numbers and detects the absence/dropping of an expected packet based upon missing sequence numbers. In response to detecting the absence/dropping of an expected packet, the receiving instance, such as a tool agent or NPB application, communicates with the agent controller to provide information concerning the detection of dropped packets. The agent controller then communicates drop protection and/or reconfiguration rules to the tap agents to instruct the tap agents associated with the dropped packets to adjust their monitoring operations. In certain embodiments, the receiving instance, such as a tool agent or NPB application, sends drop detection messages and/or reconfiguration messages directly to the tool agent that can include drop information and/or reconfiguration rules for the tap agent. For example, instructions can be provided through the drop protection rules to reduce the volume of monitoring-related packets generated and transmitted by the tap agents. In addition, the tool agent, NPB application, and/or the agent controller can also generate an alert message based upon the detection of dropped packets. For example, such alert messages can be used to log that a loss in monitoring fidelity has occurred, to log that corrective action has been taken, to notify an operator that a loss in monitoring fidelity has occurred, to notify an operator that corrective action has been taken, and/or to communicate or log other alert information. Other variations could also be implemented while still taking advantage of the drop detection and protection techniques described herein.

Figure 2:
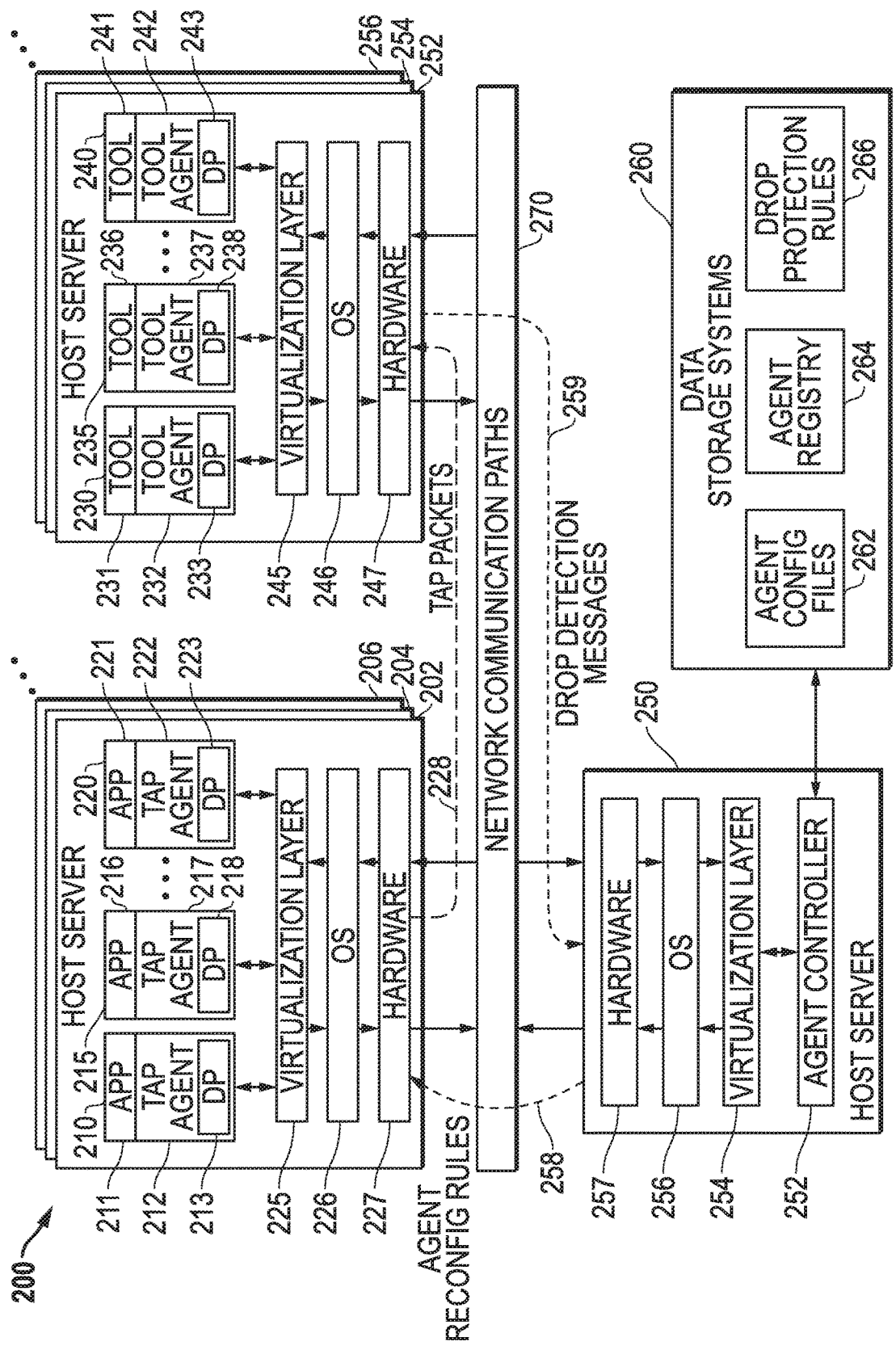
FIG. 2 is a block diagram of an example embodiment for a network packet monitoring system that includes packet drop detection and protection for packet monitoring within virtual processing environments.

FIG. 2 is a block diagram of an example embodiment 200 for a network packet monitoring system that includes packet drop detection and protection for packet monitoring within virtual processing environments. For the example embodiment 200, network applications 211, 216 . . . 221 operate as virtual application instances within virtual platforms 210, 215 . . . 220 operating within host server 202. Similar network applications and virtual platforms can operate in additional host servers 204 and 206, and so on, to send and receive network packets through the network communication paths 270. Network tap agents 212, 217 . . . 222 operate as virtual tap instances within virtual platforms 210, 215 . . . 220 operating within the host server 202, and the tap agents 212/217/222 monitor and capture packet traffic associated with the network applications 211/216/221. Although a tap agent 212/217/222 is shown as associated with each of the applications 211/216/221 to monitor network traffic for that application, it is also noted that one or more of the tap agents 212/217/222 could also be configured to monitor network traffic for multiple network applications. Similar tap agents can operate with respect to network applications and virtual platforms running in the additional host servers 204 and 206, and so on. The network applications 211/216/221 and tap agents 212/217/222 operate within a virtualization layer 225 that operates on top of an operating system (OS) 226 which in turn operates on computer hardware 227. The computer hardware 227 is coupled to communicate with the network communication paths 270, for example, through one or more network interface cards and/or other network connections.

Network tools 231, 236 . . . 241 operate as virtual tool instances within virtual platforms 230, 235 . . . 240 operating within host server 252. Similar network tools and virtual platforms can operate in additional host servers 254 and 256, and so on, to receive monitored network packets associated with the network applications 211/216/221 and/or associated with other packet traffic within the network communication paths 270. Network tool agents 232, 237 . . . 242 operate as agent instances within virtual platforms 230, 235 . . . 240 that are operating within the host server 252. The tool agents 232/237/242 receive the captured packet traffic from the tap agents 212/217/22 and forward this captured packet traffic to the network tools 231/236/241. Similar tool agents can operate with respect to network tools and virtual platforms running in the additional host servers 254 and 256, and so on. The network tools 231/236/241 and tool agents 232/237/242 operate within a virtualization layer 245 that operates on top of an operating system (OS) 246 which in turn operates on computer hardware 247. The computer hardware 247 is coupled to communicate with the network communication paths 270, for example, through one or more network interface cards and/or other network connections.

An agent controller 252 operates as virtual platform on a host server 250, and the agent controller 252 communicates with the tap agents 212/217/222 and tool agents 232/237/242 in order to monitor, manage, and/or control the tap agents 212/217/222 and tool agents 232/237/242. The agent controller 252 operates within a virtualization layer 254 that operates on top of an operating system (OS) 256 which in turn operates on computer hardware 257. The computer hardware 257 is coupled to communicate with the network communication paths 270, for example, through one or more network interface cards and/or other network connections.

As described herein, the tap agents 212/217/222 include drop protection (DP) engines 213/218/223 that encapsulate packets captured by the tap agents 212/217/22 and add sequence numbers to these capture packets. In addition to sequence numbers, a stream identifier as well as target identifiers, source identifiers, and/or timestamps can also be included as part of the encapsulation header as described further below. The encapsulated packets are then forwarded by the tap agents 212/217/222 as tap packets 228 to one or more of the target tool agents 232/237/242. The tool agents 232/237/242 include DP engines 233/238/243. The tool agents 232/237/242 receive the tap packets 228 targeted to them and analyze the sequence numbers (and stream numbers if included) for these tap packets 228. For example, as described below with respect to FIG. 6B, drop protection engine 233 analyzes the sequence numbers as well as the stream identifiers (if used) to detect drops of packets within the tap packets received from tap agents. The tool agents 232/237/242 deem a packet drop to have occurred if missing sequence numbers are detected within the tap packets 228. When drops are detected by the tool agents 232/237/242, the tool agents 232/237/242 send one or more drop detection messages 259 to the agent controller 252 identifying the details of the detected drop event. The agent controller 252 analyzes the drop detection messages 259 to determine an appropriate response. As described herein and further below with respect to FIG. 5, the tool agents 232/237/242 can also send the drop detection messages 259 and/or additional reconfiguration messages based upon the drop detection directly to the tap agents 212/217/222.

The agent controller 252 then sends one or more reconfiguration rules 258 to adjust the packet monitoring operations of one or more of the tap agent 212/217/222 associated with the detected drop event. As such, the network monitoring system of embodiment 200 dynamically adapts to conditions in the transport network and/or the host servers to improve the fidelity of the monitoring data communicated as tap packets 228 from the tap agents 212/217/222 to the tool agents 232/237/242. Exemplary adjustments include, but are not limited to, decreasing sampling rates for selecting captured packets to forward as tap packets 228, truncating payloads for captured packets forwarded as tap packets 228, generating and sending metadata rather than payload data for captured packets forwarded as tap packets 228, and/or other desired changes to reduce the likelihood of dropped packets within the tap packets 228.

The agent controller 252 can also use one or more data storage systems 260 to store agent configuration files 262, an agent registry 264, drop protection rules 266, and/or other desired information. The agent configuration files 262 are used to provide the tap agents 212/217/222 and tool agents 232/237/242 within instructions for the monitoring, capture, and distribution of network packets. The agent registry 264 includes an ordered list of the tap agents 212/217/222 operating within the network monitoring system and being managed by the agent controller 252. The drop protection rules 266 include rules that are used to instruct the tap agents 212/217/222 to adapt their operations in response to detected drop events communicated through the drop detection messages 259. The agent controller 252 can also store additional information in the data storage systems 260, and the data storage systems 260 can be included as part of the host server 250. It is noted that the data storage systems 260 can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums.

It is noted that network communication paths 270 can include one or more wired network communication paths, wireless network communication paths, or a combination of wired and wireless communication paths. The network communication paths 270 can also include one or more intervening network communication devices or systems within a network communication infrastructure. Further, one or more different communication protocols can be used within the network communication paths 270 to communicate network packets through the network communication paths 270. It is noted that the communications 228, 258, and 259 can occur through the network communication paths 270 and/or through one or more other communication paths such as direct packet communications.

It is further noted that the host servers 202/204/206/250/252/254/256 can be implemented using one or more programmable integrated circuits to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuit can be programmed with software or other programming instructions to implement the functionality described herein. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein for the host servers 202/204/206/250/252/254/256 and their respective components.

It is further noted that installing tap functionality through the tap agents 212/217/222 within each of the application virtual platforms 210/215/220 has a number of advantages. For example, scaling is handled implicitly as the tap agents 212/217/222 will scale directly with the scaling of the application virtual platforms 210/215/220. New application virtual platform instances will include a tap agent, and any reduction in the number of application virtual platform instances will also remove any tap agents running in those application virtual platform instances. Further, from inside the application virtual platforms 210/215/220, the tap agents 212/217/222 have access to metadata that is outside the contents of the packet itself allowing for a broader basis for high-level forwarding configurations. For example, packet collection or filtering decisions can be made on the basis of operating system (OS), platform metadata, processing metrics (e.g., CPU load), and/or desired information apart from the packets contents themselves. Further examples of information outside the packet contents, which can be used to configure client/tool packet monitor applications and/or to generate filter configurations, include hardware architectures (e.g., number of processors, types of processors, numbers of network interfaces, types of network interfaces), hardware metrics (e.g., processor utilization, memory utilization), operating systems, hypervisor types, virtual platform instance metadata (e.g., hostname, virtual operating system, kernel version, other software versions), processing environment information, client provided metadata, and/or other types of data not within the packets themselves. Other variations can also be implemented and other advantages may also be achieved while still taking advantage of the drop detection and protection techniques described herein.

Figure 3:
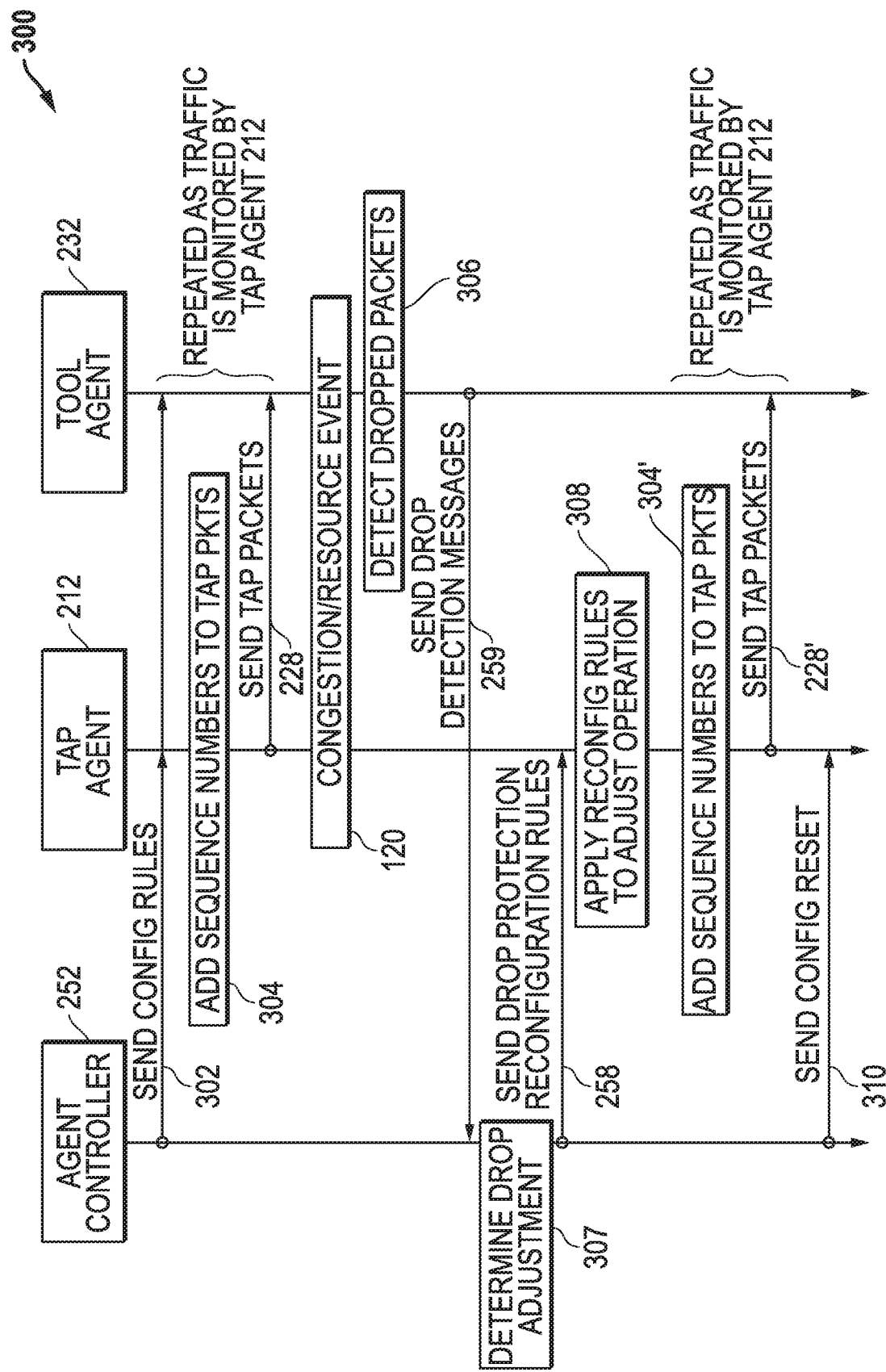
FIG. 3 provides a swim lane diagram of an example embodiment for drop detection and protection using sequence numbers and/or stream identifiers to facilitate detection of packet drops within communications of monitored and captured packets in a virtual processing environment.

FIG. 3 provides a swim lane diagram of an example embodiment 300 for drop detection and protection using sequence numbers and/or stream identifiers. The agent controller 252 sends configuration rules 302 to the tap agent 212 and to tool agent 232. The configuration rules provided to the tap agent 212 determine how the tap agent 212 will operate to monitor, capture, and forward packets associated with packet traffic communicated with respect to one or more network applications that the tap agent 212 is monitoring. The configuration rules provided to the tool agent 232 determine how the tool agent 232 will operate to receive, process, and forward captured packets to one or more tool instances that are associated with the tool agent 232.

The tap agent 212 then operates to monitor and capture packets associated with packet traffic for one or more network applications that the tap agent 212 is monitoring. As indicated by block 304, the tap agent 212 adds sequence numbers (as well as stream identifiers if used) to the tap packets 228. These tap packets 228 are then sent to the tool agent 232 for further processing and forwarding to one or more tool instances associated with the tool agent 232. This adding of sequence numbers (and stream identifiers if used) to monitored and captured packets, as indicated in block 304, and subsequent forwarding of tap packets 228 with the sequence numbers (and stream identifiers if used) to the tool agent 232 continues as traffic is monitored by the tap agent 212.

At some point for embodiment 300, it is assumed that a congestion and/or resource event 120 associated with network communications or the server systems causes packets to be dropped within the tap packets 228 being communicated between the tap agent 212 and the tool agent 232. As indicated by block 306, this packet drop is detected by the tool agent 232 based upon missing sequence numbers within the tap packets 228. After this detection of dropped packets, the tool agent 232 sends a drop detection message 259 to the agent controller 252 providing details of the detected drop event. For example, the number of dropped packets, the tap agent associated with the dropped packets, the application instance associated with the dropped packets, and/or other drop related information can be included within the drop detection message 259. As indicated by block 307, the agent controller 252 then determines an adjustment based upon the drop related information within the drop detection message 259. The agent controller 252 then generates and sends reconfiguration rules 258 to the tap agent 212 as a reconfiguration message that identifies operational changes to be implemented by the tap agent 212 to provide drop protection in response to the congestion/resource event 120. The tap agent 212 then applies this reconfiguration rules to adjust its operation. As indicated above, exemplary adjustments include, but are not limited to, decreasing sampling rates for transmitting captured packets, truncating payloads for captured packets, sending metadata only for captured packets, and/or other desired changes to reduce the likelihood of dropped packets.

After adjusting its operation, the tap agent 212 continues to add sequence numbers (and stream identifiers if used) to monitored and captured packets, as indicated in block 304', and subsequently forwards the tap packets 228' with the sequence numbers (and stream identifiers if used) to the tool agent 232. This again continues as traffic is monitored by the tap agent 212. It is also noted that for additional drop events 120 detected by the tool agent 232, the blocks 306, 307, and 308 along with message 258 and 259 are also repeated. As such, the operation of the tap agent 212 is dynamically adjusted to protect against subsequent packet drops with respect to the tap packets 228 being forwarded by the tap agent 212.

It is further noted that the agent controller 252 can also be configured to send a configuration reset message 310 to the tap agent 212. This configuration reset 310 can instruct the tap agent 212, for example, to remove one or more adjustments made to its operation and/or return to its original configuration rules. Such a reset can be implemented, for example, after selected timeout periods of time where no drop detection messages 259 are received from the tool agent 232. For example, where an adjustment was made to reduce the number of captured packets sent by the tap agent 212 as tap packets 228 to the tool agent 232, this adjustment can be removed so that the tap agent 212 returns to a higher rate (e.g., its original rate) of packet transmission. If the conditions leading to the congestion/resource event 120 no longer exist, then this return to a higher rate of tap packet transmission will not cause packet drops. However, if the congestion/resource event 120 does still exist, then an additional drop event will be detected by the tool agent 232, and it will send appropriate drop detection messages 259. Other variations could also be implemented while still taking advantage of the drop detection and protection techniques described herein.

Figure 4:
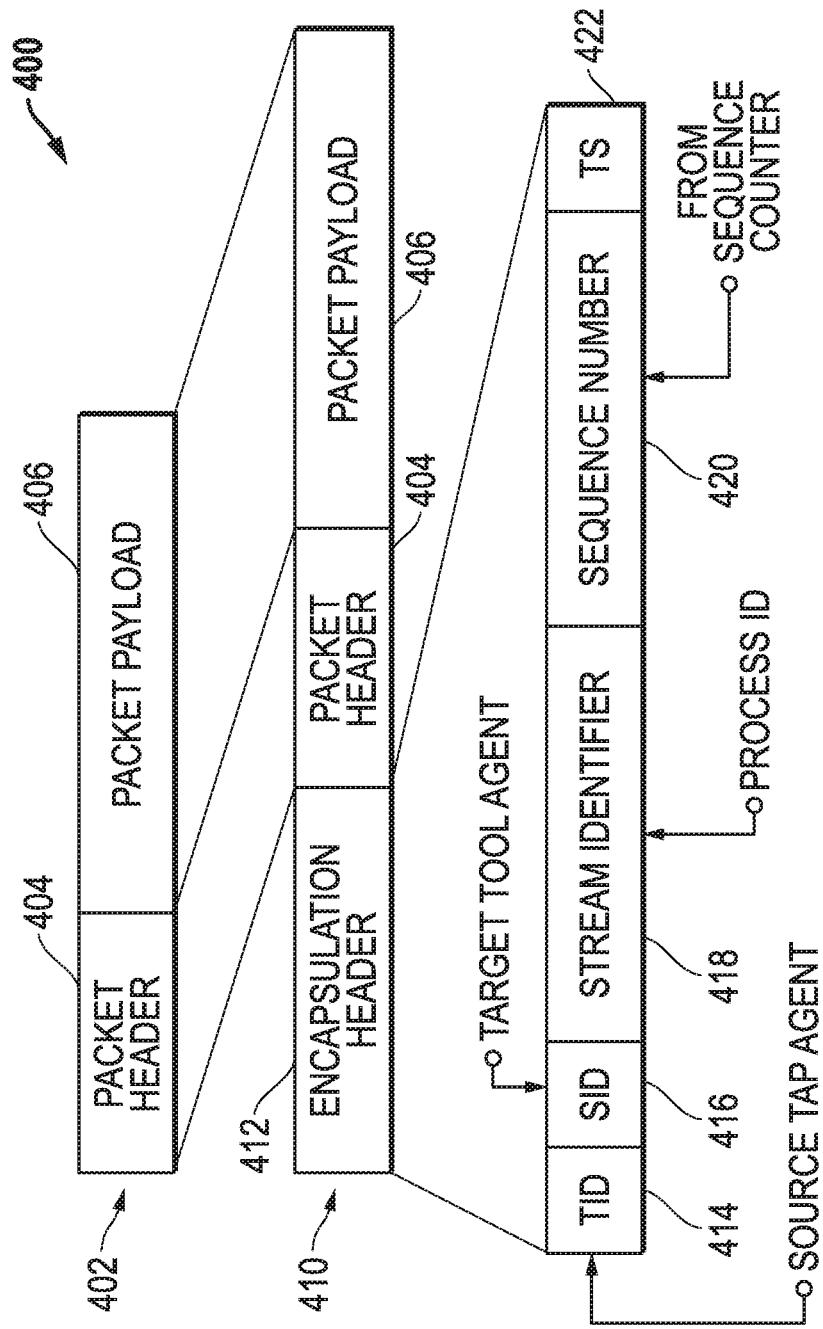
FIG. 4 provides a packet diagrams for example embodiment for packet encapsulation that can be used by tap agents to facilitate detection of packet drops within communications of monitored and captured packets in a virtual processing environment.

FIG. 4 provides a packet diagrams for example embodiment 400 for packet encapsulation that can be used by the tap agents 212/217/222. The original captured packet 402 includes a packet header 404 and a packet payload 406. It is understood that network packets within traffic being monitored by the tap agents 212/217/222 can include additional and/or different fields. To generate an encapsulated packet 410 that will be forwarded as one of the tap packets 228, the tap agents 212/217/222 add an encapsulation header 412 to the original captured packet 402. This encapsulation header 412 includes a sequence number 420. The sequence number 420, for example, can be generated by a sequence counter. The encapsulation header 412 can also include a target identifier (TID) 414 that identifies the target tool agent for the encapsulated packet 410 as well as a source identifier (SID) 416 that identifies the source tap agent for the captured packet 402. For certain embodiments, the target identifier (TID) 414 can be generated using VPN (virtual private network) identifiers, although other target identification techniques can also be used such as GRE (generic routing encapsulation) and/or other encapsulation and routing techniques. In additional embodiments, a timestamp (TS) 422 can be included within the encapsulation header 412 and used with respect to the time periods discussed below for determining if a sequence number has been missed, for determining if a reset message should be sent, and/or for other desired purposes. For example, the timestamp 422 can be generated by a timestamp generator when the encapsulated packet 410 is generated, and the timestamp 422 can then be inserted into the header 412 for the encapsulated packet 410. The encapsulated packet 410 can also be encrypted by the tap agent prior to being transmitted as tap packets 228 and then unencrypted by the tool agent after receipt. Other variations can also be implemented while still taking advantage of the drop detection and protection techniques described herein.

For certain embodiments, the encapsulation header 412 can also include a stream identifier 418. For example, where multiple processes are operating with respect to a tap agent to monitor and capture packets, different sequence number counters may be run by these different processes. As such, it is possible that the same sequence number could be generated by multiple of these different processes. It is useful in these circumstances, therefore, to include a stream identifier 418 that identifies the particular process that generated the captured packet 402 among multiple processes run by the tap agent. It is noted that each encapsulated packet 410 will have a unique sequence number 420 if stream identifiers 418 are not included. However, if stream identifiers 418 are included, packets 410 having the same stream identifier 418 will each have a unique sequence number 420 with respect to each other, while packets 410 with different stream identifiers 428 could have matching sequence numbers 420.

When the sequence number 420 and the stream identifier 418 are included, the tool agents 232/237/242 analyze the sequence numbers generated by a particular stream identifier and detect a packet drop if there is a missing sequence number within these packets. If the sequence number 420 is not included, then the tool agents 232/237/242 analyze the sequence numbers and detect a packet drop if there is a missing sequence number. As a further example, the tool agents 232/237/242 can keep track of received sequence numbers and then determine that a packet drop has occurred only when the next sequence number is not received within some selected time period. In other words, as long as a tap packet is received with the next sequence number within the selected time period, a packet drop event will not be deemed to have occurred. Other variations could also be implemented while still taking advantage of the drop detection and protection techniques described herein.

Figure 5:
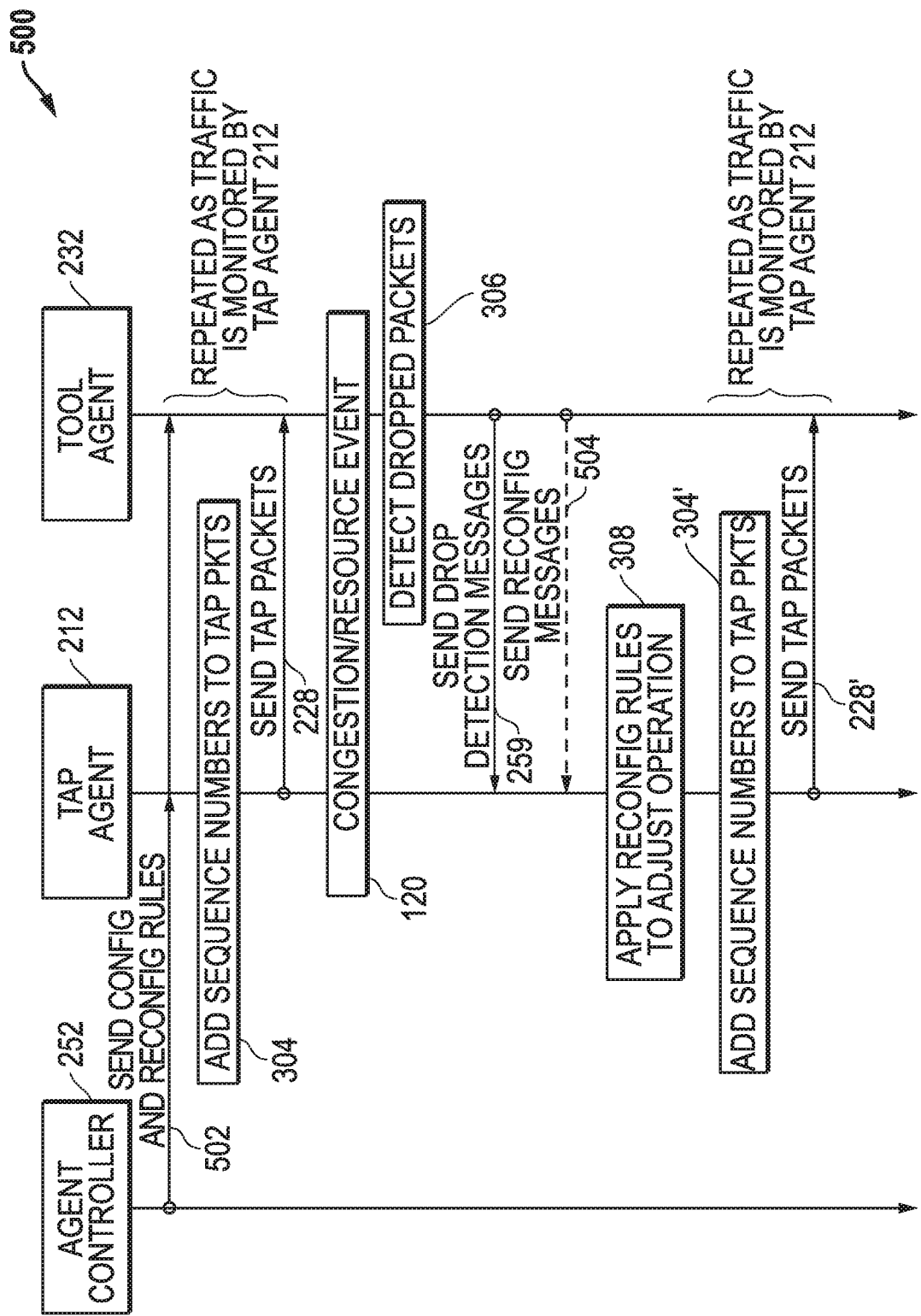
FIG. 5 provides a swim lane diagram of an example embodiment for drop detection and protection using sequence numbers and/or stream identifiers where the drop detection message is sent directly from the tool agent to the tap agent.

FIG. 5 provides a swim lane diagram of an example embodiment 500 for drop detection and protection using sequence numbers and/or stream identifiers where the drop detection message 259 is sent directly from the tool agent 232 to the tap agent 212. For this example embodiment 500, the tap agent 212 and the tool agent 232 are initially configured with configuration rules, and the configuration rules for the tap agent 212 include one or more reconfiguration rules to apply in case of a drop detection event. For one embodiment, these configuration including reconfiguration rules are sent by the agent controller 252 as indicated by arrow 502. However, the tap agent 212 and/or the tool agent 232 could also be preconfigured with these configuration rules including the reconfiguration rules for the tap agent 212. In addition, the tap agent 212 and/or the tool agent 232 could also receive the configuration and/or reconfiguration rules from another network connected device. Still further, the reconfiguration rules could be received by the tap agent 212 from the tool agent 232 as part of the drop detection messages 259 and/or in additional messages as indicated by dashed arrow 504 and discussed further below. Other variations could also be implemented while still taking advantage of the drop detection and protection techniques described herein.

As described above with respect to FIG. 3, the configuration rules for the tap agent 212 determine how the tap agent 212 will operate to monitor, capture, and forward packets associated with packet traffic communicated with respect to one or more network applications that the tap agent 212 is monitoring. The configuration rules for the tool agent 232 determine how the tool agent 232 will operate to receive, process, and forward captured packets to one or more tool instances that are associated with the tool agent 232. The tap agent 212 then operates to monitor and capture packets associated with packet traffic for one or more network applications that the tap agent 212 is monitoring. As indicated by block 304, the tap agent 212 adds sequence numbers (as well as stream identifiers if used) to the tap packets 228. These tap packets 228 are then sent to the tool agent 232 for further processing and forwarding to one or more tool instances associated with the tool agent 232. This adding of sequence numbers (and stream identifiers if used) to monitored and captured packets, as indicated in block 304, and subsequent forwarding of tap packets 228 with the sequence numbers (and stream identifiers if used) to the tool agent 232 continues as traffic is monitored by the tap agent 212.

At some point for embodiment 500, it is assumed that a congestion and/or resource event 120 associated with network communications or the server systems causes packets to be dropped within the tap packets 228 being communicated between the tap agent 212 and the tool agent 232. As indicated by block 306, this packet drop is detected by the tool agent 232 based upon missing sequence numbers within the tap packets 228. After this detection of dropped packets, the tool agent 232 sends a drop detection message 259 to the tap agent 212, and this drop detection message can again include details of the detected drop event, such as for example, the number of dropped packets, the tap agent associated with the dropped packets, the application instance associated with the dropped packets, and/or other drop related information. In addition, the tool agent can also send one or more reconfiguration messages as indicated by arrow 504 that include details of the drop detection, one or more reconfiguration rules, actions to take in respond to the drop detection, and/or other drop detection related instructions or information for the tap agent 212.

In response to the drop detection messages 259 and/or the reconfiguration messages 504 received from the tool agent 232, the tap agent 212 identifies operational changes to be implemented by the tap agent 212 to provide drop protection in response to the congestion/resource event 120. For example, the tap agent 212 can use reconfiguration rules previously stored or configured for the tap agent 212 in response to receiving the drop detection messages 259 and/or the reconfiguration messages 504. The tap agent 212 can also apply new and/or different configuration rules or actions provided directly from the tool agent 232. The tap agent 212 then applies this reconfiguration rules to adjust its operation. As indicated above, exemplary adjustments include, but are not limited to, decreasing sampling rates for transmitting captured packets, truncating payloads for captured packets, sending metadata only for captured packets, and/or other desired changes to reduce the likelihood of dropped packets.

After adjusting its operation, the tap agent 212 continues to add sequence numbers (and stream identifiers if used) to monitored and captured packets, as indicated in block 304', and subsequently forwards the tap packets 228' with the sequence numbers (and stream identifiers if used) to the tool agent 232. This again continues as traffic is monitored by the tap agent 212. It is also noted that for additional drop events 120 detected by the tool agent 232, the blocks 306 and 308 along with messages 259 and optional messages 504 are also repeated. As such, the operation of the tap agent 212 is dynamically adjusted to protect against subsequent packet drops with respect to the tap packets 228 being forwarded by the tap agent 212.

It is further noted that the agent controller 252 can also be configured to reset its operation to an original configuration based upon a configuration reset message received by the tap agent 212 and/or based upon other operational conditions or configurations. For example, the tap agent 212 can be configured to remove one or more adjustments made to its operation and/or return to its original configuration rules after receiving a reset signal, or after a selected timeout period of time where no drop detection messages 259 are received from the tool agent 232, and/or based upon some other desired criteria. For example, where an adjustment was made to reduce the number of captured packets sent by the tap agent 212 as tap packets 228 to the tool agent 232, this adjustment can be removed so that the tap agent 212 returns to a higher rate (e.g., its original rate) of packet transmission. If the conditions leading to the congestion/resource event 120 no longer exist, then this return to a higher rate of tap packet transmission will not cause packet drops. However, if the congestion/resource event 120 does still exist, then an additional drop event will be detected by the tool agent 232, and it will send appropriate drop detection messages 259. Other variations could also be implemented while still taking advantage of the drop detection and protection techniques described herein.

Figure 6A:
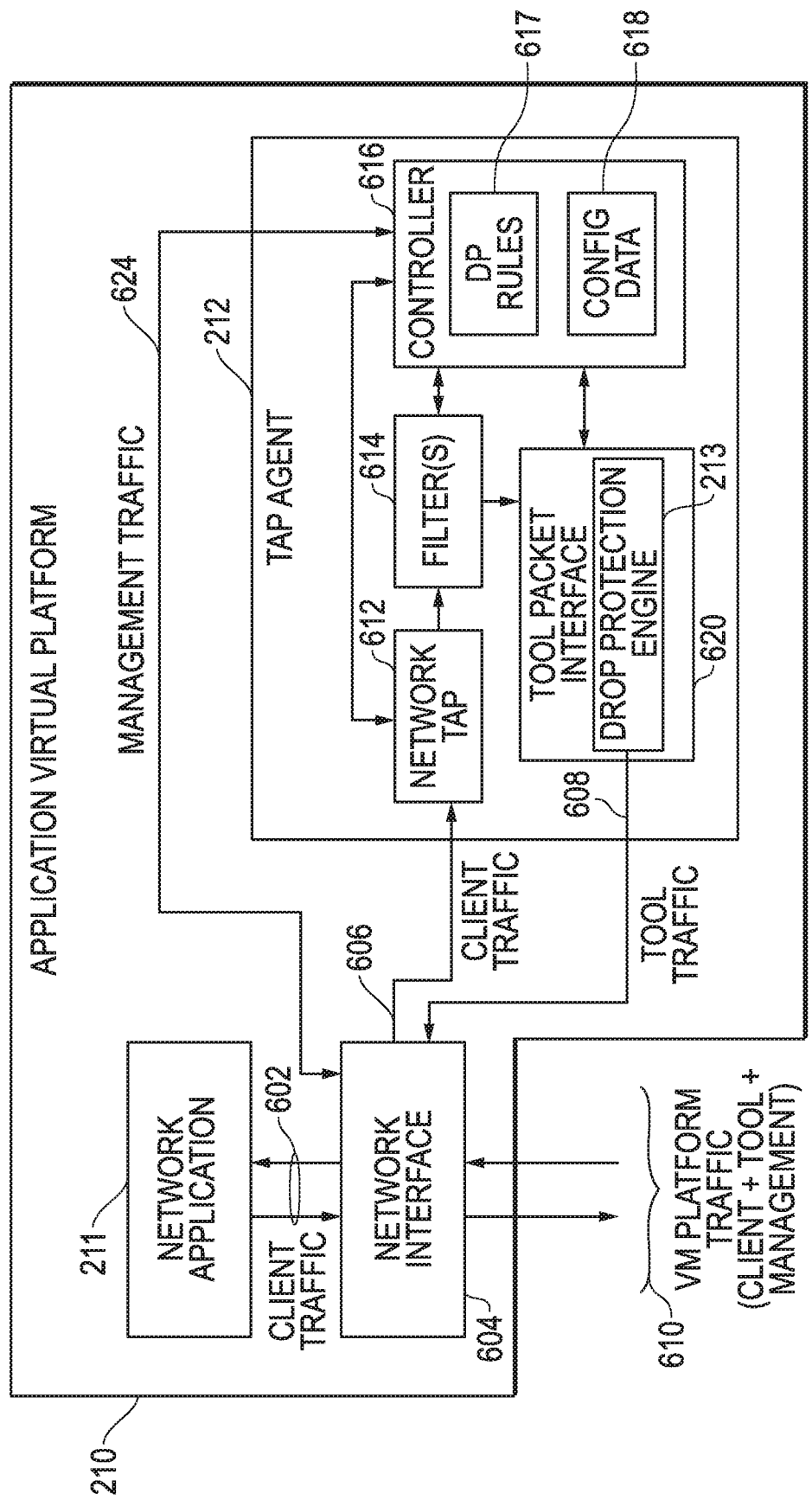
FIG. 6A is a block diagram of an example embodiment for an application virtual platform that includes a tap agent having a drop protection engine and storing drop protection rules.

FIG. 6A is a block diagram of an example embodiment for an application virtual platform 210 that includes a tap agent 212. The tap agent 212 includes a network tap 612, one or more filters 614, tool packet interface 620, and controller 616. The controller 616 operates to control the components of the tap agent 212 and stores drop protection rules 617 as well as other configuration data 618. The tool packet interface 620 can also include a drop protection engine 213, for example, where packet encapsulation including sequence numbers as well stream identifiers (if used) are added to captured packets as described above. The network application 211 sends and receives packets as client traffic 602 through a virtual network interface 604. The virtual network interface 604 in turn communicates virtual platform traffic 610 with other virtual platforms and/or external systems through the network communication paths 270. This virtual platform traffic 610 includes client traffic 602, tool traffic 608 directed to one or more network tools or other destinations, management traffic 624 communicated with the agent controller 252, and any other traffic for the application virtual platform 210.

In operation, the network tap 612 operates to obtain copies 606 of the client traffic 602 being communicated through the network interface 604. This copied traffic 606 is then processed by one or more filters 614 to identify traffic of interest to be captured. The controller 616 applies the rules associated with the configuration data 618 as well as any drop protection rules 617 that have been received to the filters 614 to provide for packet capture and drop detection and protection as described herein. These captured packets are sent to the tool packet interface 620 where the drop protection engine 213 adds encapsulation headers to the captured packets that includes sequence numbers as well as stream identifiers (if used). The resulting tool traffic 608 is then provided back to the network interface 604 for communication as part of the virtual platform traffic 610.

Figure 6B:
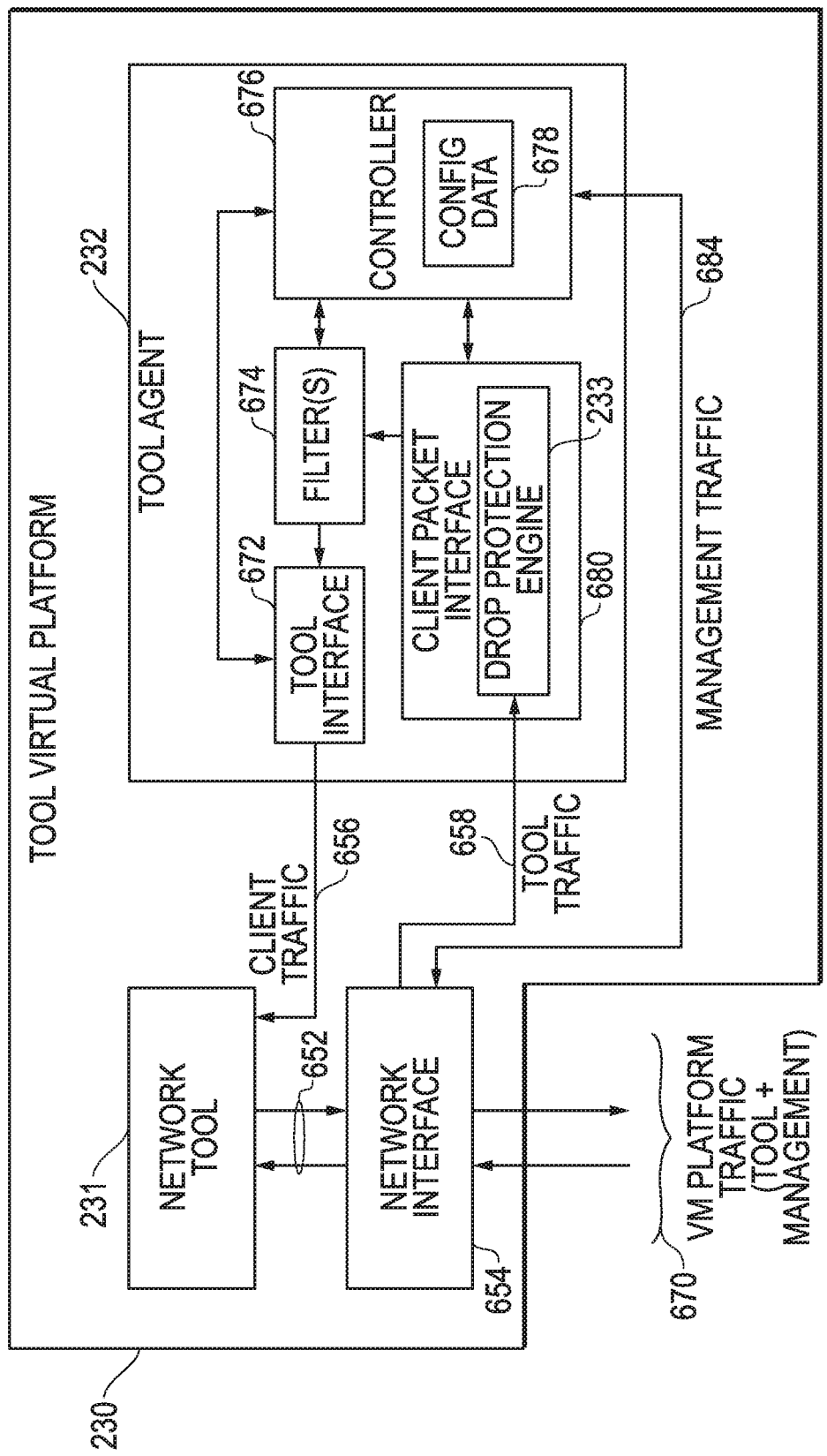
FIG. 6B is a block diagram of an example embodiment for a tool virtual platform that includes a tool agent including a drop protection engine.

FIG. 6B is a block diagram of an example embodiment for a tool virtual platform 230 that includes a tool agent 232. The network tool 231 includes a tool interface 672, one or more filters 674, client packet interface 680, and controller 676. The client packet interface 680 also includes a drop protection engine 233 that analyzes the sequence numbers as well as the stream identifiers (if used) to detect drops of packets within the tap packets received from tap agents. The controller 676 operates to control the components of the tool agent 232 and to store configuration data 678. The network tool 231 analyze received packets within client traffic 656 from the tool agent 232. The network tool 231 can also send and receive other traffic 652 directly through a network interface 654. The network interface 654 communicates virtual platform traffic 670 with other virtual platforms and/or external systems through the network communication paths 270. As described herein, this virtual platform traffic 670 includes tool traffic 658 from one or more tap agents, management traffic 684 communicated with the agent controller 252, and any other traffic for the tool virtual platform 230.

In operation, the client packet interface 680 receives tool traffic 658 communicated by the tap agents. The client packet interface 680 uses the drop protection engine 233 to analyze the sequence numbers and stream identifiers (if used) within the encapsulated packets for the tap packets 228 within the tool traffic 658. As describe above, if sequence numbers are determined to be missing, then a packet drop is determined to have occurred, and the controller 676 sends a drop detection message 259 to the agent controller 252. After removal of any encapsulation headers, the tool traffic 658 is also processed by one or more filters 674 to further select traffic of interest. The filtered traffic of interest is then provided to the tool interface 672, and this resulting client traffic 656 is communicated to the network tool 231.

It is noted that the filters 614/674 in FIGS. 6A and 6B can rely upon various portions of the content of network packets to identify and filter packets. For example, filters 614/674 can be configured to rely upon data and/or information associated with any network layer header values or packet field contents to perform such actions. With respect to network layers, packet-based communications are often described in terms of seven communication layers under the ISO/OSI (International Standards Organization/Open Systems Interconnect) model: application layer (L7), presentation layer (L6), session layer (L5), transport layer (L4), network layer (L3), data link layer (L2), and physical layer (L1). Packet headers associated with any of these layers as well as packet data payload contents, therefore, can be used by the filters 614/674. For example, information pertinent to identifying a packet, such as source ID and destination ID and protocol type, is often found in one or more network layer headers. Packets also have various other identification fields and content information within them that may be matched and used to collect and aggregate information about packets and related packet flows. Still further, the filters 614/674 can also rely upon non-packet content related information. For example, information concerning application states, message states, operating system, and/or other information that is not within the packets themselves can be used by the filters 614/674. Thus, a wide variety of packet content and non-packet content related data and information can be identified and used by the filters 614/674.

FIG. 7 is a block diagram of an example embodiment 700 for a host server such as host servers 202/204/206/250/252/ 254/256. For the example embodiment depicted, the host server 700 includes one or more processors 702 or other programmable integrated circuits that are programmed to provide a virtualization layer 722 on top of which operates one or more virtual platforms 712, 714, . . . 716. The host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 722 and the virtual platforms 712/714/716 run on top of a host operating system (OS) 720. For example, the host operating system 720, the virtualization layer 722, and the virtual platforms 712/714/716 can be initialized, controlled, and operated by the processors or programmable integrated circuits 702 which load and execute software code and/or programming instructions stored in the data storage systems 708 to perform the functions described herein.

The memory 703 can include one or more memory devices that store program instructions and/or data used for operation of the host server 700. For example, during operation, one or more of the processor(s) 702 can load software or program instructions stored in the data storage systems 708 into the memory 703 and then execute the software or program instructions to perform the operations and functions described herein. In addition, for operation, one or more of the processors 702 or other programmable integrated circuit(s) can also be programmed with code or logic instructions stored in the data storage systems 708 to perform the operations and functions described herein. It is noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the drop detection and protection techniques described herein.

The virtualization layer 722 for the virtual platforms described herein can be implemented using any desired virtualization layer, such as using a hypervisor or a container engine, that provides a virtual processing environment for the virtual platforms. Using a hypervisor, as shown in FIG. 8A below, the tap/tool agents can operate along with an application 802/812 on a guest operating system 806/816 within one of the virtual platforms 712/714 which in turn run on top of the hypervisor as the virtualization layer 722. Using a container engine, as shown in FIG. 8B below, the tap/tool agents can operate along with applications 802/812 within a virtual platform 712 that operates on top of a container engine as the virtualization layer 722. As depicted in FIG. 8B, the virtual platform 712 operates on top of the container engine 722 without the emulated hardware (HW) 808 and without the guest operating system (OS) 806 that are shown with respect to the embodiment of FIG. 8A. As such, this container engine embodiment of FIG. 8B provides a more streamlined technique to add tap/tool agents to a virtual processing environment. For one embodiment, the container engine can be implemented as a DOCKER container for a Linux operating system configured to execute DOCKER containers, which are software components that are designed to be compatible with a Linux-based DOCKER container engine. Other variations could also be implemented.

Looking now in more detail to FIG. 8A, a diagram is provide of an example embodiment 800 that uses a hypervisor to provide a virtualization layer 722. For the embodiment 800, emulated virtual machines operate as virtual platforms 712 and 714 operate on top of hypervisor 722 which in turn operates on top of host operating system (OS) 720 which in turn operates on top of server hardware 820. For this embodiment 800, emulated hardware (HW) resources 808 and a guest operating system (OS) 806 are provided for virtual machine 712, and virtual machine 712 executes binary code (BINS) or libraries (LIBS) 804 on top of the guest operating system 806 to provide a first application (APP A) 802. Similarly, emulated hardware (HW) resources 818 and a guest operating system (OS) 816 are provided for virtual machine 714, and virtual machine 714 executes binary code (BINS) or libraries (LIBS) 814 on top of guest operating system 816 to provide a second application (APP B) 812. Thus, each of the virtual platforms 712 and 714 have separate emulated hardware resources 808/818 and guest operating systems 806/816. For embodiment 800 as indicated above, a tap/tool agent can be installed and operated within one of the virtual machines 712/714 on top of the guest operating system 806/816 along with one of the application 802/812.

FIG. 8B is a block diagram of an example embodiment 850 that uses a container engine to provide a virtualization layer 722. For the embodiment 850, the applications 802/812 effectively operate as virtual platform 712 on top of container engine 722 which operates on top of host operating system (OS) 720 which in turn operates on top of server hardware 820. For this embodiment 850, binary code (BINS) or libraries (LIBS) 804 executes and operates directly on top of the container engine 722 to provide a first application (APP A) 802. The binary code (BINS) or libraries (LIBS) 814 similarly executes and operates directly on top of the container engine 722 to provide a second application (APP B) 812. As such, the container engine 722 provides a direct interface to the host operating system 720 without need for emulated hardware (HW) resources 808/818 and/or guest operating systems 806/816 as used in FIG. 8A. For embodiment 850 as indicated above, a tap/tool agent when installed can operate along with the other applications 802/812 on top of the container engine 722 effectively as part of the virtual platform 712.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the drop detection and protection techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to reduce packet drops for network traffic monitoring, comprising:
   communicating network traffic with a network application operating within a first virtual processing environment within a first host server;
   at a tap agent also operating within the first virtual processing environment: monitoring and capturing packets from the network traffic;
   encapsulating at least some number of the captured packets with headers including sequence numbers to generate tap packets; and
   forwarding at least some number of the tap packets to a tool agent operating within a second virtual processing environment within a second host server;
   at the tool agent operating within the second virtual processing environment:
   detecting dropped tap packets within the tap packets based upon the sequence numbers and outputting a drop detection message based upon the detected dropped tap packets, wherein the drop detection message identifies the tap agent that transmitted the tap packets and indicates the occurrence of dropping of at least one of the tap packets; and
   at the tap agent:
   adjusting operation of the tap agent based upon the drop detection message to reduce drops of tap packets within subsequent tap packets forwarded by the tap agent to the tool agent, wherein adjusting the operation of the tap agent based upon the drop detection message includes generating metadata for subsequent captured packets and forwarding the metadata rather than packet payload data to the tool agent, wherein the tool agent comprises a network packet analysis tool; and
   continuing to forward the metadata rather than the packet payload data to the network packet analysis tool until a reset message is received from the network packet analysis tool.

2. The method of claim 1, further comprising receiving the drop detection message at an agent controller and, at the agent controller, generating a reconfiguration message based upon the drop detection message and sending the reconfiguration message to the tap agent.

3. The method of claim 1, wherein the drop detection message is received directly by the tap agent from the tool agent.

4. The method of claim 1, wherein the encapsulating adds a unique sequence number to each tap packet.

5. The method of claim 1, wherein the encapsulating adds a stream identifier and a sequence number to each tap packet, wherein a plurality of processes are run by the tap agent to monitor and capture packets, wherein the stream identifier identifies a process among the plurality of processes associated with capture of each packet, and wherein tap packets having a same stream identifier are encapsulated to have unique sequence numbers with respect to each other.

6. The method of claim 1, wherein the adjusting further comprises at least one of decreasing sampling rates and truncating payloads for at least some of the subsequent captured packets.

7. The method of claim 1, wherein the network packet analysis tool sends the reset message to the tap agent based upon a selected timeout period during which additional dropped packets are not detected.

8. The method of claim 1, wherein the detecting is based upon a tap packet with a next sequence number not being received within a selected time period.

9. The method of claim 8, wherein the encapsulating includes timestamps in the tap packets, and wherein the detecting uses the timestamps.

10. The method of claim 1, further comprising generating and sending an alert message based upon the drop detection message, the alert message providing at least one of a log that a drop has occurred or an indication that an adjustment action has been taken.

11. A network system to reduce packet drops for network traffic monitoring, comprising:
a first host server for a network communication system programmed to provide a first virtual processing environment comprising:
a network application configured to communicate network traffic; and
a tap agent configured to monitor and capture packets from the network traffic, encapsulate at least some number of the captured packets with headers including sequence numbers to generate tap packets, and to forward at least some number of the tap packets to a tool agent operating within a second virtual processing environment; and
a second host server for a network communication system programmed to provide the second virtual processing environment;
wherein the tool agent is configured to detect dropped tap packets within the tap packets based upon the sequence numbers and to output a drop detection message based upon the detected dropped tap packets, wherein the drop detection message identifies the tap agent that transmitted the tap packets and indicates the occurrence of dropping of at least one of the tap packets; and
wherein the tap agent is further configured to adjust operation of the tap agent based upon the drop detection message to reduce drops of tap packets within subsequent tap packets forwarded by the tap agent to the tool agent, wherein adjusting the operation of the tap agent based upon the drop detection message includes generating metadata for subsequent captured packets and forwarding the metadata rather than payload data to the tool agent, wherein the tool agent comprises a network packet analysis tool and wherein the tap agent continues to forward the metadata rather than the packet payload data to the network packet analysis tool until a reset message is received from the network packet analysis tool.

12. The network system of claim 11, wherein further comprising an agent controller configured to receive the drop detection message, to generate a reconfiguration message based upon the drop detection message, and to send the reconfiguration message to the tap agent.

13. The network system of claim 11, wherein the drop detection message is received directly by the tap agent from the tool agent.

14. The network system of claim 11, wherein the tap agent is configured to encapsulate by adding a unique sequence number to each tap packet.

15. The network system of claim 11, wherein the tap agent is configured to encapsulate by adding a stream identifier and a sequence number to each tap packet, wherein the stream identifier is configured to identify one of a plurality of process associated with capture of each packet by the tap agent, and wherein the tap agent is configured to encapsulate tap packets having a same stream identifier with unique sequence numbers with respect to each other.

16. The network system of claim 11, wherein the tap agent is further configured to adjust operation by at least one of decreasing sampling rates and truncating payloads for at least some of the subsequent captured packets.

17. The network system of claim 11, wherein network packet analysis tool sends the reset message to the tool agent based upon a selected timeout period during which additional dropped packets are not detected.

18. The network system of claim 11, wherein the tool agent is configured to detect a dropped packet based upon a tap packet with a next sequence number not being received within a selected time period.

19. The network system of claim 18, wherein the tap agent is configured to encapsulate by adding timestamps to the tap packets, and wherein the tool agent is configured to use the timestamps to detect dropped packets.

20. The network system of claim 11, wherein an alert message is generated based upon the drop detection message, and wherein the alert message is configured to provide at least one of a log that a drop has occurred or an indication that an adjustment action has been taken.

* * * * *